Patented Aug. 30, 1949

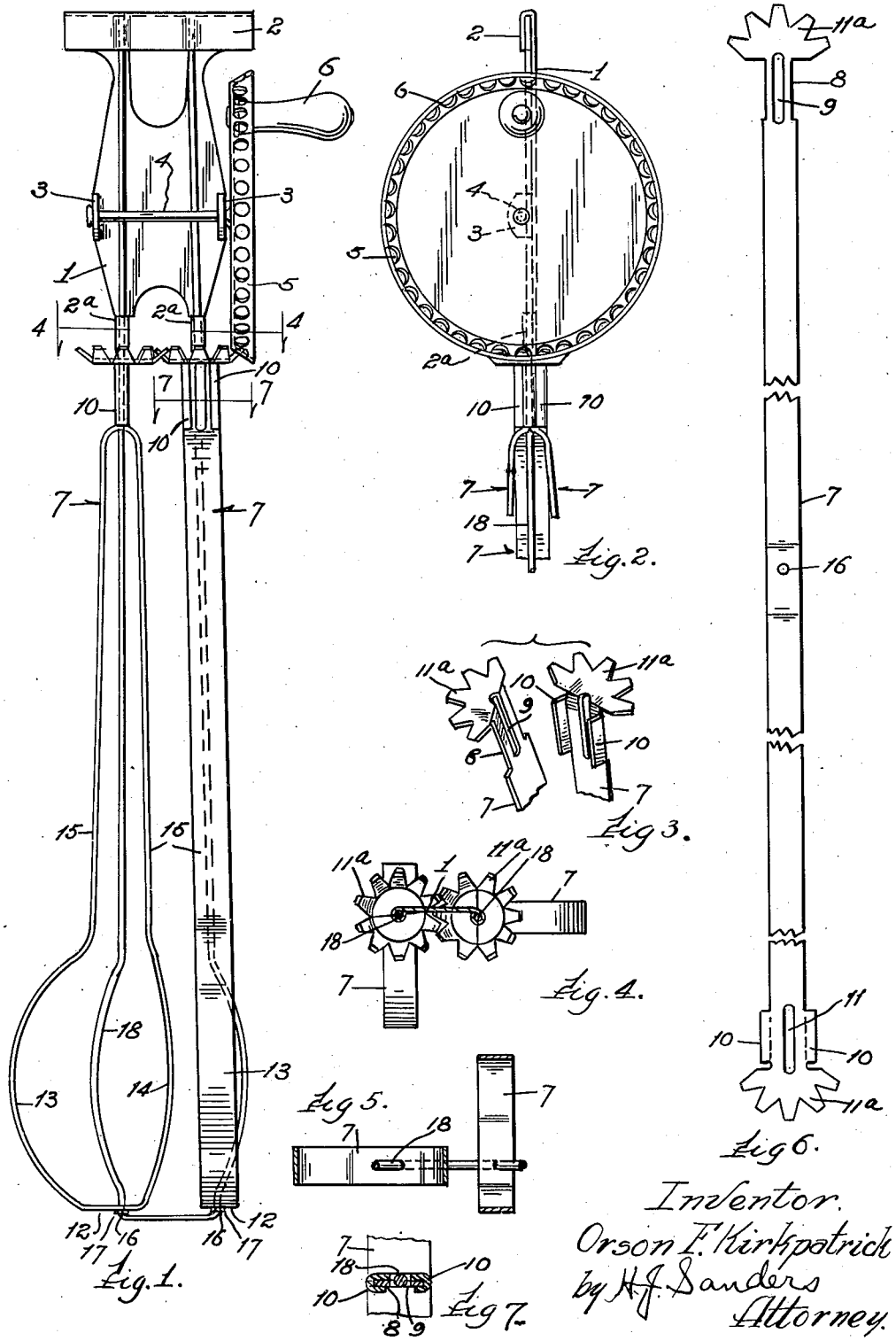

2,480,482

UNITED STATES PATENT OFFICE 2,480,482

EGG BEATER

Orson Florry Kirkpatrick, Muscatine, Iowa

Application May 31, 1947, Serial No. 751,551

1 Claim. (Cl. 259—131)

This invention relates to egg beaters of the hand operated type. One object is to provide an egg beater having blades of novel formation designed to beat, whip and stir the eggs in a most thorough and efficient manner, a plurality of paths or "furrows of agitation" being set up by the blade action so that in the case of eggs, cream and the like a frothy condition is arrived at more quickly and therefore with less effort than heretofore possible as far as I am aware.

A further object is to provide an egg beater having blades of one-piece formation including its transmission gear, the blade shanks being secured together without the aid of added fastening means. A still further object is to provide an egg beater of simple construction, of few parts, compact in assembly and durable in use.

Other objects, novel features and advantages of arrangement, construction and design comprehended by the invention are hereinafter more fully pointed out or made apparent from the following description of a preferred embodiment as illustrated in the accompanying drawing wherein like reference characters denote corresponding parts throughout.

In the drawing:

Fig. 1 is a view in elevation of the instant egg beater.

Fig. 2 is a side view of the upper portion of Fig. 1.

Fig. 3 is a fragmentary separated view of the egg beater.

Fig. 4 is a cross sectional view through the egg beater at a point above the blade gears, looking in the direction of the blades, taken on line 4—4 of Fig. 1.

Fig. 5 is a fragmentary cross sectional view illustrating the tie rod connection between the blades.

Fig. 6 is a view of the blade and gear strip, broken, before it is folded into assembled position, and, Fig. 7 is an horizontal cross sectional view taken on the line 7—7 of Fig. 1 looking in the direction of the arrows.

The reference numeral 1 denotes a somewhat oblong web-like frame having its upper end folded back upon itself to form the lip 2, its lower end recessed and terminating in spaced sleeves 2a, and adjacent its longitudinal central portion provided with the opposed ears 3, 3 arranged marginally of said body, said ears operatively supporting the rotary shaft 4 having fast thereupon the conventional toothed operating wheel 5 provided with the handle 6. A pair of flat or ribbon-like resilient metal strips 7, 7 of counterpart formation, each at one end having a contracted short portion 8 formed with a longitudinal slot 9 and a wide end forming wings 10, 10 separated by a like longitudinal slot 11, each strip terminating in a half-gear 11a, each strip being bent to form a blade base portion 12, a bulged regularly rounded operative blade portion 13 and a relatively flat or but slightly bulged co-operating blade portion 14 and slightly tapered shank portions 15, 15, each bulged portion differing in degree from every other bulged portion, said wings being bent about the contracted strip portion 8 bringing the half-gear portions 11a, 11a together to form a complete gear, the teeth thereof being bent slightly in the direction of the lip 2 so that the gears of the two strips mesh with each other and one meshes with the wheel 5.

The base portion 12 of each blade has a perforation 16 punched therein, the metal being forced outwardly as shown at 17, Fig. 1, a wire rod 18 having its ends secured between the frame 1 and lip 2 and extending longitudinally of the frame through sleeves 2a, through the aligned slots 9, 11, between the shanks 15 and through the base perforations 16, that portion of the wire between the blade bulges being bent or curved somewhat, as shown, this wire serving to retain the blades in operative assembly.

When the handle 6 is rotated the wheel 5 rotates the gears 11a and blades, the blade portions 13, 14 making separate "furrows" or paths, four in number, as the curvature of the several portions 13, 14 varies. These strips are so positioned relatively that the paths of their blades cut each other at different points as the strips are rotated.

What is claimed is:

In an egg beater, a pair of strips of counterpart formation, blades formed by bending said strips into coacting base portions, bulged rounded portions, slightly bulged cooperating portions and tapered shank portions; each strip having a contracted slotted short portion and a slotted wide portion, wings defined by said wide portion disposed about said contracted short portion, juxtaposed half-gears integral with and bent at right angles to the ends of each strip, the half-gears of one strip in mesh with those of the other strip, a toothed operating wheel meshing with one pair of half-gears, a frame carrying said operating wheel, and a tie rod carried by said frame passing through the slots of said strips and connecting the said blades.

ORSON FLORRY KIRKPATRICK.

REFERENCES CITED

The following references are of record in the file of this patent:

UNITED STATES PATENTS

| Number | Name | Date |
|---|---|---|
| 206,742 | Mann | Aug. 6, 1878 |
| 1,954,507 | Wheeler | Apr. 10, 1934 |
| 1,965,650 | Kail | July 10, 1934 |
| 1,992,654 | Elliott | Feb. 26, 1935 |